(12) United States Patent
Kubo

(10) Patent No.: US 8,385,278 B2
(45) Date of Patent: Feb. 26, 2013

(54) MOBILE RADIO TERMINAL AND COMMUNICATION PROCESSING METHOD

(75) Inventor: Yoshiyuki Kubo, Hino (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 569 days.

(21) Appl. No.: 12/554,405

(22) Filed: Sep. 4, 2009

(65) Prior Publication Data
US 2010/0061305 A1 Mar. 11, 2010

(30) Foreign Application Priority Data

Sep. 5, 2008 (JP) ................................. 2008-228755

(51) Int. Cl.
H04W 4/00 (2009.01)
H04M 1/00 (2006.01)
(52) U.S. Cl. .......................... 370/329; 370/341; 370/350
(58) Field of Classification Search .................... None
See application file for complete search history.

(56) References Cited

U.S. PATENT DOCUMENTS

| 7,039,438 | B2* | 5/2006 | Khlat | 455/552.1 |
|---|---|---|---|---|
| 8,135,782 | B2 | 3/2012 | Kitani | |
| 2008/0165698 | A1* | 7/2008 | Dalsgaard et al. | 370/252 |
| 2008/0181127 | A1* | 7/2008 | Terry et al. | 370/252 |
| 2008/0318621 | A1* | 12/2008 | Fan et al. | 455/552.1 |
| 2009/0270099 | A1* | 10/2009 | Gallagher et al. | 455/435.1 |
| 2010/0142498 | A1* | 6/2010 | Hyounhee | 370/337 |
| 2010/0290427 | A1* | 11/2010 | Sebire et al. | 370/331 |
| 2011/0096748 | A1* | 4/2011 | Meyer et al. | 370/329 |

FOREIGN PATENT DOCUMENTS

| JP | 2007-081501 A | 3/2007 |
|---|---|---|
| JP | 2007-228288 A | 9/2007 |
| JP | 2008-154225 A | 7/2008 |

OTHER PUBLICATIONS

3GPP TS 23.272 V8.0.0 section 4.2; 7.2 (Fig.7.2-1), Annex B.2.2, B.2.3, Release 8, 4 pages.
JP Office Action mailed on Jun. 12, 2012 as received in application No. 2008-228755.

* cited by examiner

Primary Examiner — Chi Pham
Assistant Examiner — Soon-Dong D Hyun
(74) Attorney, Agent, or Firm — Maschoff Gilmore & Israelsen

(57) ABSTRACT

A mobile radio terminal includes a radio transmission/reception unit and a control unit. The radio transmission/reception unit uses a radio signal to perform transmission and reception to and from a base station belonging to a circuit switching network, and also uses a radio signal to perform transmission and reception to and from a base station belonging to a mobile communication network. The mobile communication network is connected to the circuit switching network and forms an integrated communication network together with the circuit switching network. When the mobile radio terminal is on standby in a base station belonging to the mobile communication network, the control unit activates the radio transmission/reception unit and controls the radio transmission/reception unit so as to maintain synchronization with a base station belonging to the circuit switching network.

21 Claims, 15 Drawing Sheets

☐ : E-UTRAN Paging MONITORING INTERMITTENT WAKE-UP

▨ : 1x CS ACCESS NETWORK SYNCHRONIZATION ACQUISITION WAKE-UP

MOBILE RADIO TERMINAL AND COMMUNICATION PROCESSING METHOD

CROSS-REFERENCE TO RELATED APPLICATION

This application is based upon and claims the benefit of priority from the prior Japanese Patent Application No. 2008-228755 filed on Sep. 5, 2008; the entire contents of which are incorporated herein by reference.

BACKGROUND OF THE INVENTION

1. Field of the Invention

The present invention relates to a mobile radio terminal a communication processing method, and particularly to a mobile radio terminal and a communication processing method capable of connecting to a circuit switching (CS) access network if the mobile radio terminal receives a CS service event while being on standby in an Evolved Universal Terrestrial Radio Access Network (E-UTRAN).

2. Description of the Related Art

The 3GPP is a standardization body for standardizing third-generation cellular phone standards. The 3GPP TS23.272 V8.0.0 (hereinafter referred to as "TS23.272") developed by the 3GPP defines a method of cooperative operation (CS Fallback) performed if, in an Evolved Packet System (EPS) integrating an E-UTRAN and a mobile communication network having a CS network, a CS service is carried out while a mobile radio terminal (user equipment (UE)) is on standby in the E-UTRAN. Examples of the mobile communication network include a Universal Terrestrial Radio Access Network (UTRAN), a GSM/EDGE Radio Access Network (GERAN), and a cdma2000 1x CS access network (hereinafter referred to as "1x CS access network").

FIG. 1 illustrates an overview of an EPS having a CS Fallback function. As illustrated in FIG. 1, the EPS has an E-UTRAN, a UTRAN, and a GERAN. The UTRAN and GERAN serve as access networks that provide CS services. The E-UTRAN, UTRAN, and GERAN are connected, through their respective interfaces, to a Mobile-services Switching Center (MSC) Server within a Core Network (CN). The EPS is configured to have the E-UTRAN, UTRAN, and GERAN, the latter two serving as access networks that provide CS services, but may be configured to have a 1x CS access network.

In an EPS having a CS Fallback function, a mobile radio terminal performs a standby operation typically in an E-UTRAN. If a CS service event, such as a CS incoming call notification from the EPS or a service request within the mobile radio terminal (e.g., CS outgoing call, CS incoming call, or CS Short Message Service (SMS)), occurs, the mobile radio terminal connects to a UTRAN and a GERAN, or to a 1x CS access network to perform the CS service. Then, the mobile radio terminal transmits and receives information to and from the network. Sections 6.4 and 7.2 describe processing to be carried out if a mobile radio terminal that is on standby in an E-UTRAN base station performs outgoing and incoming call operations on a UTRAN or GERAN that provides CS services. FIG. 2 illustrates a sequence in which a mobile radio terminal that is on standby in an E-UTRAN base station receives a CS incoming call and connects to a UTRAN or a GERAN. Also, a connection to a 1x CS access network is described in Annexes B2.2 and B2.3.

FIG. 3 illustrates a processing sequence performed between a mobile radio terminal and each component of an EPS if the mobile radio terminal which is on standby in an E-UTRAN transmits an outgoing call signal to a 1x CS access network. FIG. 4 illustrates a processing sequence performed between a mobile radio terminal and each component of an EPS if the mobile radio terminal which is on standby in an E-UTRAN processes an incoming call from a 1x CS access network.

According to TS23.272, if being on standby in an E-UTRAN and using a CS Fallback function, a mobile radio terminal can use CS services not directly provided by the E-UTRAN, without having to be on standby in a CS access network.

According to the 3GPP TS23.272 V8.0.0, a mobile radio terminal which is on standby in an E-UTRAN does not start connecting to a 1x CS access network until a CS service event occurs. Generally, as long as being on standby only in the E-UTRAN, the mobile radio terminal does not have to be on standby in the 1x CS access network. Therefore, only when necessary, the mobile radio terminal activates a circuit for an access network other than the E-UTRAN within the mobile radio terminal, and performs synchronization, reception of notification information, and message transmission and reception. Thus, the state where the mobile radio terminal is on standby only in the E-UTRAN is preferable in that it is possible to reduce power consumption.

However, since network synchronization is not achieved between an E-UTRAN and a CS access network, such as a UTRAN, it is not possible to determine the synchronization timing of the CS access network on the basis of that of the E-UTRAN. Therefore, if the mobile radio terminal receives a request for a CS service, it is necessary to acquire synchronization with the UTRAN. As a result, it takes long time to start the CS service. The same problem occurs in the case of the E-UTRAN and the 1x CS access network.

Hereinafter, the above problem will be described in detail. FIG. 2 illustrates a sequence performed if a mobile radio terminal which is on standby in an E-UTRAN recognizes a CS incoming call. Here, the mobile radio terminal is not on standby in a CS access network (UTRAN, GERAN, or 1x CS access network). The mobile radio terminal starts connecting to the CS access network only after receiving a notification of a CS incoming call (Paging) (see "6" of FIG. 2). FIG. 5 illustrates sequential processing performed in a mobile radio terminal if a notification of a CS incoming call (Paging) is received. Here, the mobile radio terminal includes an E-UTRAN L1 unit having a function of connecting to an E-UTRAN and a 1x CS access network L1 unit having a function of connecting to a 1x CS access network. The E-UTRAN L1 unit and the 1x CS access network L1 unit are based on lower-level protocols in a radio interface, and their processing is controlled by a communication-control central processing unit (CPU) of the mobile radio terminal.

As illustrated in FIG. 5, the mobile radio terminal uses the E-UTRAN L1 unit to be on standby only in the E-UTRAN. The mobile radio terminal uses the E-UTRAN L1 unit to perform a intermittent reception operation on a Page Indicator Channel. As illustrated in FIG. 5, an E-UTRAN base station transmits a Page Indicator, using a CS Fallback function, to communicate the presence of a CS incoming call. Upon recognizing that there has been a notification of a CS incoming call, the E-UTRAN L1 unit of the mobile radio terminal notifies a CPU that there has been a notification of a CS incoming call. To enable the 1x CS access network L1 unit to perform radio processing etc. to receive the CS incoming call, the CPU switches from the E-UTRAN L1 unit to the 1x CS access network L1 unit, and activates a radio unit etc. to allow communication in the 1x CS access network.

However, in order to return a response to the CS incoming call (i.e., to return a Paging response) to the 1x CS access network, the 1x CS access network L1 unit of the mobile radio terminal needs to search for a base station to acquire synchronization and to receive notification information. The time required to perform this series of processes may vary depending on the configuration of the mobile radio terminal, but it may take several seconds including processing overhead between radio software programs in the mobile radio terminal. Moreover, if it takes long time from receipt of Paging to returning a Paging response, a timeout of a timer waiting for a Paging response from the mobile radio terminal occurs in the EPS. As a result, the mobile radio terminal may not be able to receive an incoming call. In the case of another CS service, such as a CS outgoing call, if an outgoing call operation for making an emergency outgoing call is delayed for the same reason as that described above, the emergency outgoing call cannot be made in the worst case, which may cause discomfort to the user.

SUMMARY OF THE INVENTION

The present invention has been made in view of the circumstances described above. An object of the present invention is to provide a mobile radio terminal and communication processing method capable of transmitting, if receiving a CS service event via an E-UTRAN while being on standby in the E-UTRAN, a response to the CS service event to a CS access network.

In order to attain the above-mentioned circumstances, a mobile radio terminal according to an aspect of the present invention includes: a circuit switching network transmission/reception unit configured to perform transmission and reception to and from a base station belonging to a circuit switching network, with use of a radio signal; a mobile communication network transmission/reception unit configured to perform transmission and reception to and from a base station belonging to a mobile communication network, with use of the radio signal, the mobile communication network being connected to the circuit switching network and forming an integrated communication network together with the circuit switching network; and a control unit configured to activate the circuit switching network transmission/reception unit and control the circuit switching network transmission/reception unit so as to maintain synchronization with a base station belonging to the circuit switching network, if the mobile radio terminal is on standby in a base station belonging to the mobile communication network.

In order to attain the above-mentioned circumstances, a mobile radio terminal according to another aspect of the present invention includes: a circuit switching network transmission/reception unit configured to perform transmission and reception to and from a base station belonging to a circuit switching network including at least one of a UTRAN, a GERAN, and a cdma2000 1x CS access network, with use of a radio signal; a mobile communication network transmission/reception unit configured to perform transmission and reception to and from a base station belonging to an E-UTRAN, with use of the radio signal, the E-UTRAN being connected to the circuit switching network and forming an integrated communication network together with the circuit switching network; and a control unit configured to activate the circuit switching network transmission/reception unit and control the circuit switching network transmission/reception unit so as to maintain synchronization with a base station belonging to the circuit switching network, if the mobile radio terminal is on standby in a base station belonging to the E-UTRAN.

In order to attain the above-mentioned circumstances, a communication processing method according to an aspect of the present invention includes the steps of: preparing a mobile radio terminal having a circuit switching network transmission/reception unit; performing transmission and reception to and from a base station belonging to a circuit switching network, with use of a radio signal; performing transmission and reception to and from a base station belonging to a mobile communication network, with use of the radio signal, the mobile communication network being connected to the circuit switching network and forming an integrated communication network together with the circuit switching network; and activating the circuit switching network transmission/reception unit and controlling the circuit switching network transmission/reception unit so as to maintain synchronization with a base station belonging to the circuit switching network, if the mobile radio terminal is on standby in a base station belonging to the mobile communication network.

DETAILED DESCRIPTION OF THE INVENTION

Hereinafter, embodiments of the present invention will be described with reference to the drawings.

A mobile radio terminal according to the present invention is capable of communicating with base stations of both an E-UTRAN and a CS access network. Like an EPS described in TS23.272, a mobile communication network covered by the present invention is configured as an integrated network including an E-UTRAN and a CS access network. In the mobile communication network, EPS components are connected such that they can cooperate with each other. Additionally, the mobile communication network is configured such that a mobile radio terminal that is on standby in the E-UTRAN can use CS services. In the embodiments of the present invention, an integrated network (like an EPS) including an E-UTRAN and a CS access network is defined as "integrated communication network".

First Embodiment

Figure 1:
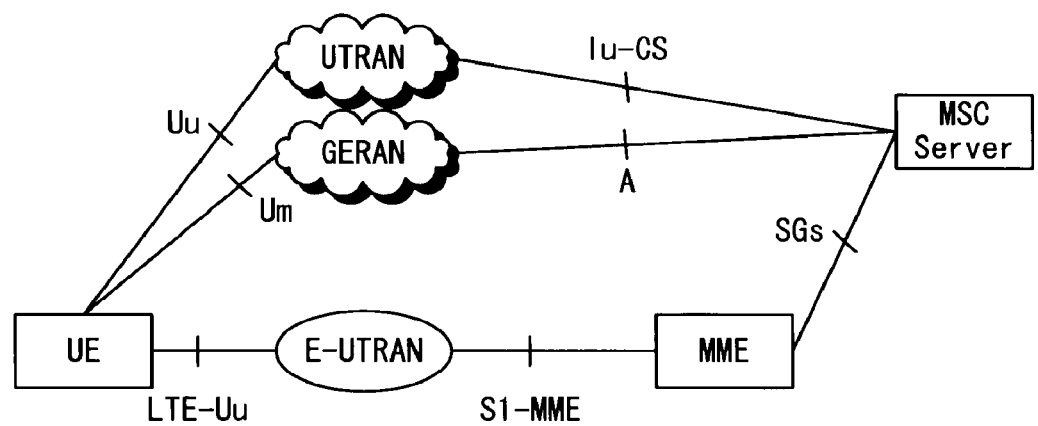
FIG. 1 illustrates an overview of an EPS having a CS Fallback function.
Figure 2:
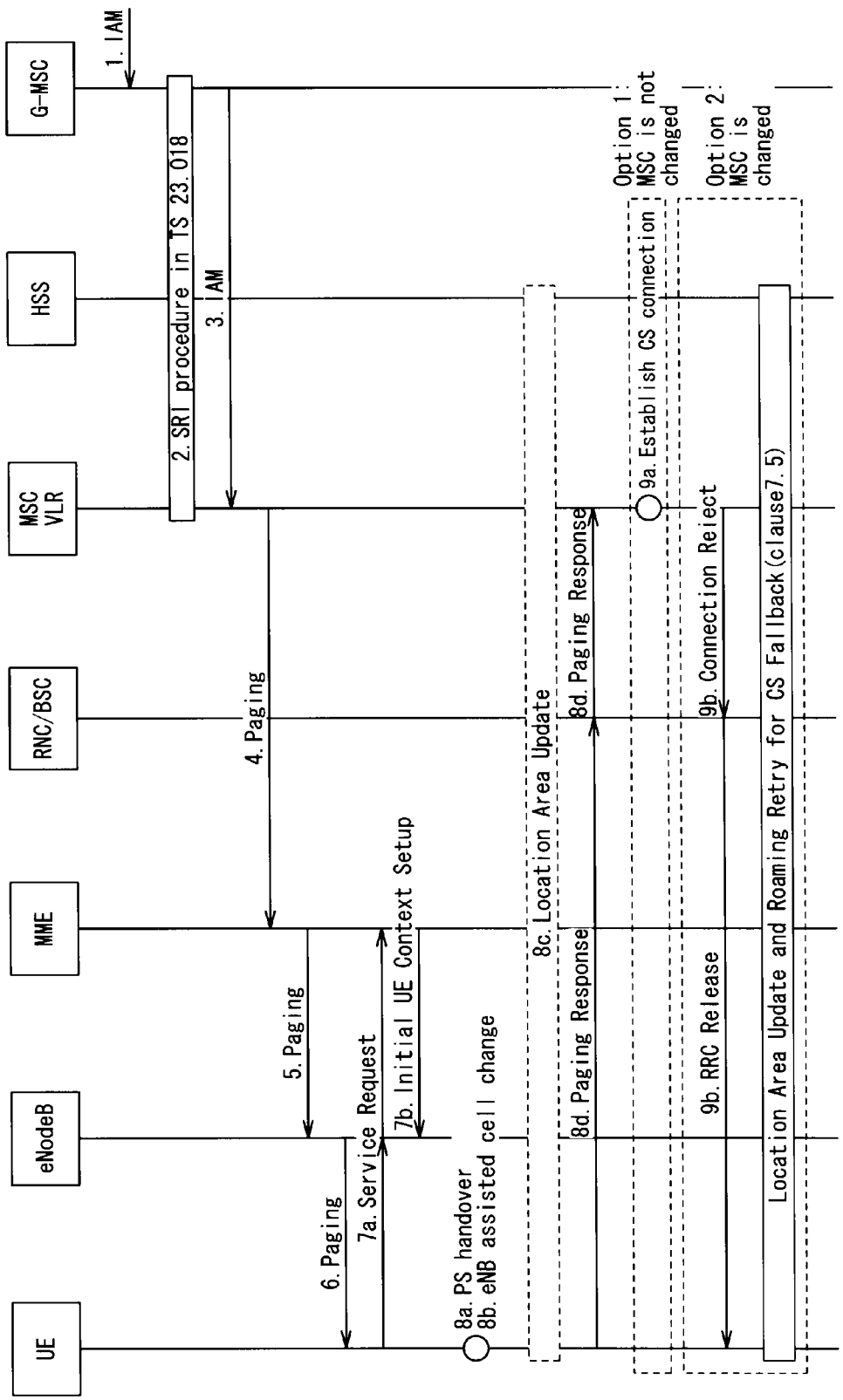
FIG. 2 illustrates a sequence in which a mobile radio terminal that is on standby in an E-UTRAN base station receives a CS incoming call and connects to a UTRAN or a GERAN.
Figure 3:
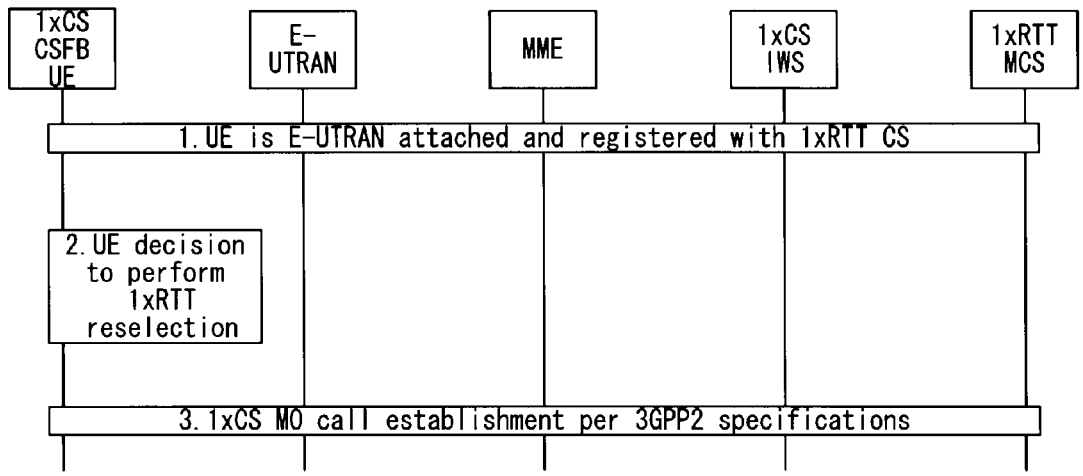
FIG. 3 illustrates a processing sequence performed between a mobile radio terminal and each component of an EPS when the mobile radio terminal that is on standby in an E-UTRAN makes an outgoing call to a 1x CS access network.
Figure 4:
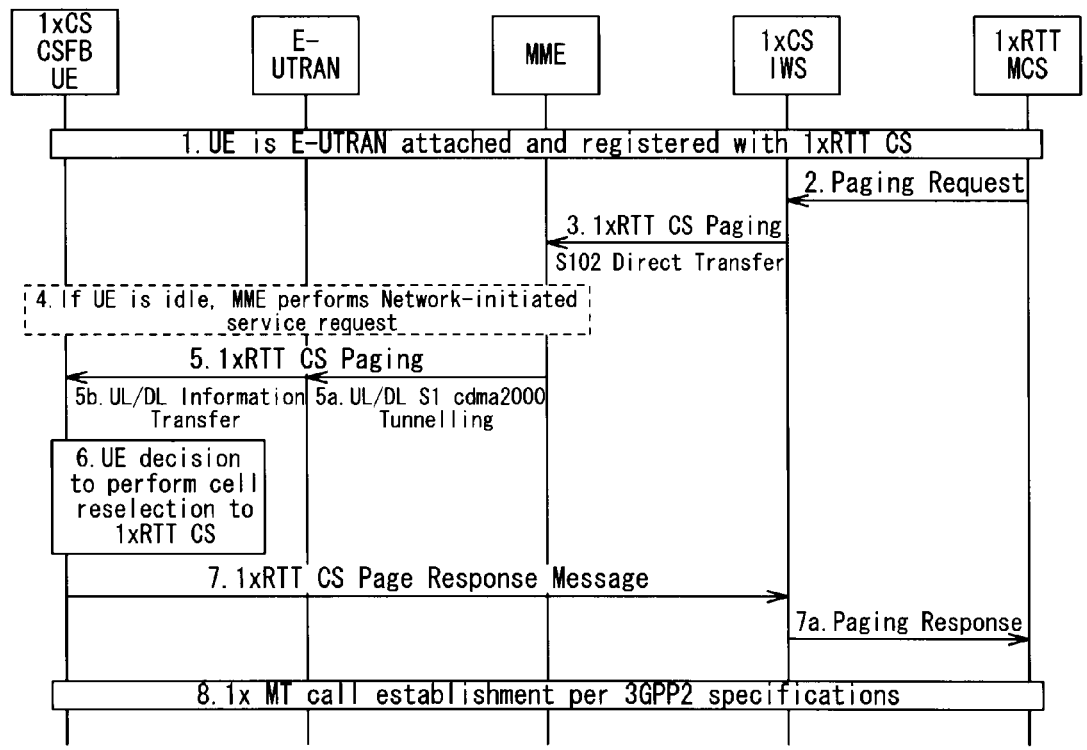
FIG. 4 illustrates a processing sequence performed between a mobile radio terminal and each component of an EPS when the mobile radio terminal that is on standby in an E-UTRAN processes an incoming call from a 1x CS access network.
Figure 5:
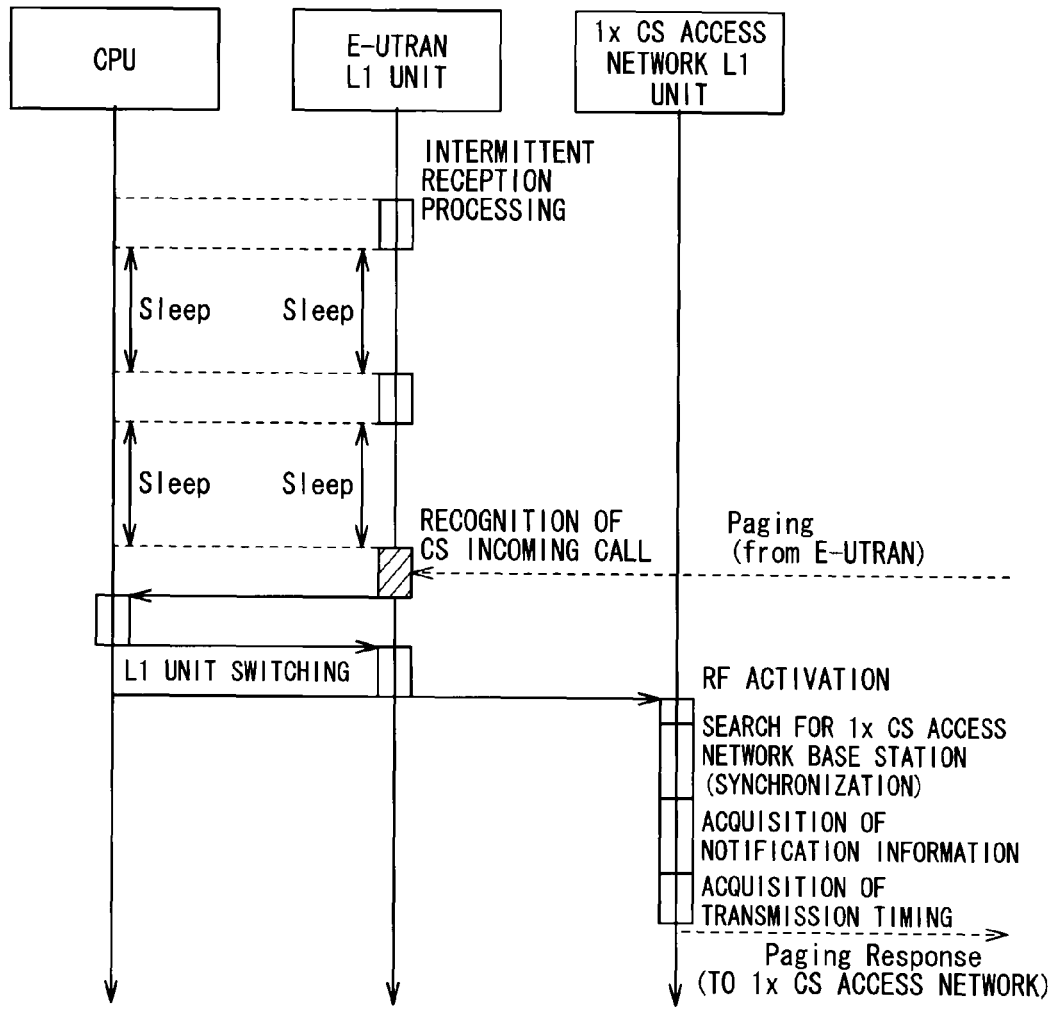
FIG. 5 illustrates sequential processing performed in a mobile radio terminal when a notification of a CS incoming call (Paging) is received.
Figure 6:
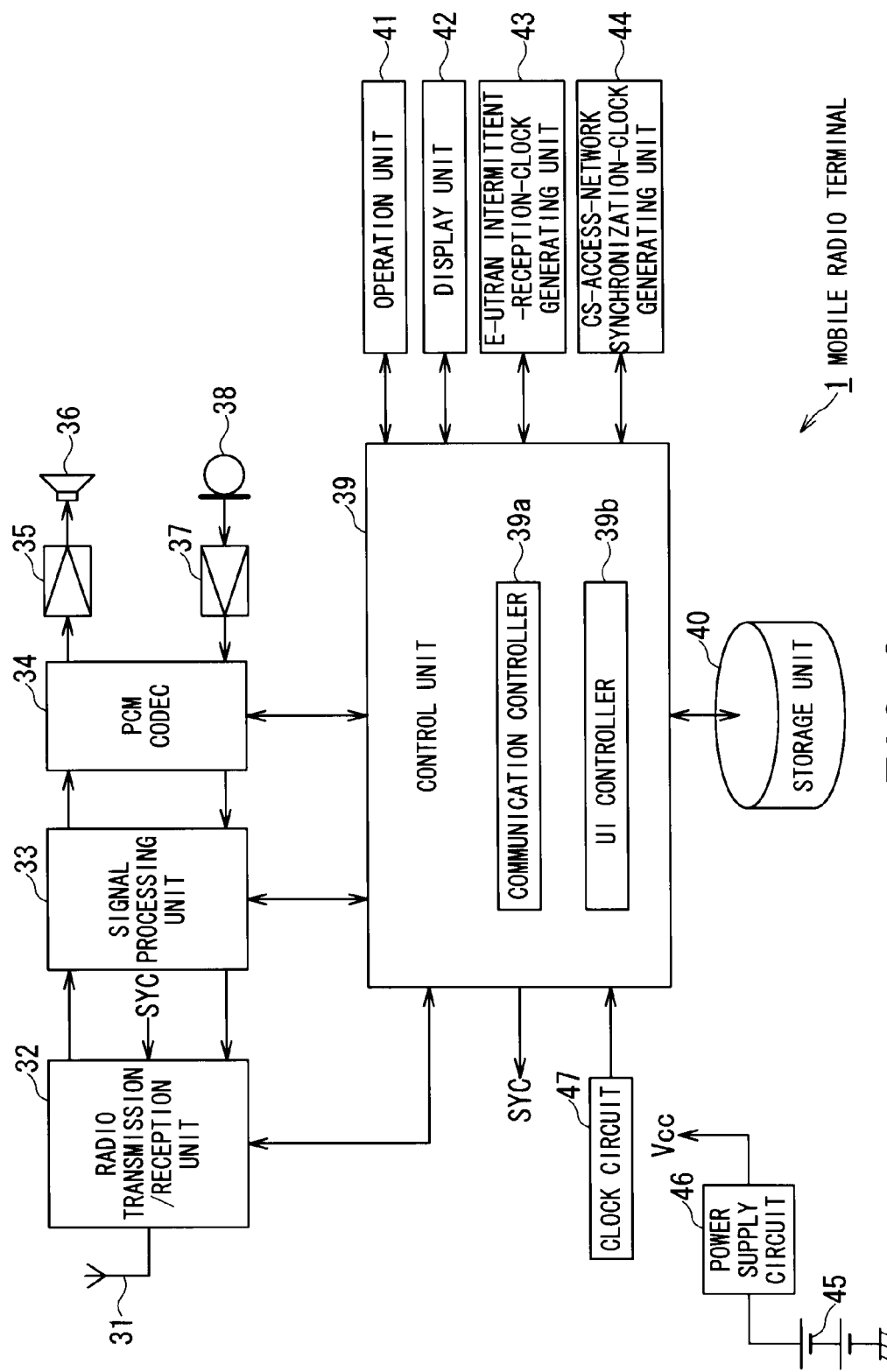
FIG. 6 is a block diagram illustrating an internal configuration of a mobile radio terminal according to a first embodiment of the present invention.

FIG. 6 illustrates an internal configuration of a mobile radio terminal 1 according to a first embodiment of the present invention. The mobile radio terminal 1 includes an antenna 31, a radio transmission/reception unit 32, a signal processing unit 33, a control unit 39, a storage unit 40, an E-UTRAN intermittent-reception-clock generating unit 43, and a CS-access-network synchronization-clock generating unit 44.

The mobile radio terminal 1 is capable of performing voice communication and data communication in both of mobile radio communication systems, an E-UTRAN method and a CS access network method. The antenna 31, the radio transmission/reception unit 32, and the signal processing unit 33 support both of these methods. The CS access network method can take several methods, such as methods using a UTRAN, a GERAN, and a 1x CS access network. In the present embodiment, a description will be given about the case where a 1x CS access network method is used as a CS access network method.

The radio transmission/reception unit 32 performs radio communication, via the antenna 31, with a base station BS included in a mobile communication network with use of the E-UTRAN method or 1x CS access network method. On the basis of a modulation signal generated by the signal processing unit 33, the radio transmission/reception unit 32 generates a radio signal having a carrier frequency indicated by the control unit 39. Also, the radio transmission/reception unit 32 receives a radio signal having a carrier frequency indicated by the control unit 39, mixes the received radio signal with a local oscillation signal output from a frequency synthesizer, and frequency-converts (down-converts) the resulting signal into an intermediate frequency signal. Then, the radio transmission/reception unit 32 generates a reception baseband signal by performing quadrature demodulation (quadrature detection) on the down-converted intermediate frequency signal. The radio transmission/reception unit 32 outputs the reception baseband signal as a reception result to the signal processing unit 33 and the control unit 39.

The signal processing unit 33 includes a digital signal processor (DSP). The signal processing unit 33 applies predetermined signal processing to the reception baseband signal to obtain reception packet data with predetermined transmission format. Additionally, the signal processing unit 33 demodulates an audio signal included in the reception packet data, and decodes the resulting signal to obtain audio data. Also, the signal processing unit 33 encodes a transmission audio signal, generates a modulation signal on the basis of audio data obtained by encoding and other data, and outputs the generated modulation signal to the radio transmission/reception unit 32.

The control unit 39 includes a CPU, a read only memory (ROM), and a random access memory (RAM). The CPU executes various kinds of processing in accordance with programs stored in the ROM, or various application programs and control programs including an operating system (OS) loaded from the storage unit 40 into the RAM. Additionally, the CPU generates various control signals, supplies them to various parts, and thus controls an overall operation of the mobile radio terminal 1.

Specifically, the control unit 39 controls a carrier frequency used by the radio transmission/reception unit 32, and searches for a pilot signal on the basis of a result of reception in the radio transmission/reception unit 32. The RAM stores data necessary for the CPU to execute various kinds of processing.

The control unit 39 includes one or more CPUs as necessary. Although the control unit 39 includes two CPUs in the present embodiment, the present invention is not limited to this. That is, the control unit 39 may include one, three, or more CPUs. A communication controller 39a includes a communication processing CPU to control communication processing. The communication controller 39a controls communication processing performed through the antenna 31, the radio transmission/reception unit 32, the signal processing unit 33, a PCM codec 34, a reception amplifier 35, and a transmission amplifier 37. A UI controller 39b includes a UI processing CPU to control UI processing performed through the storage unit 40, an operation unit 41, a display unit 42, and a clock circuit 47.

The communication controller 39a of the mobile radio terminal 1 includes an E-UTRAN L1 unit having a function of connecting to an E-UTRAN and a 1x CS access network L1 unit having a function of connecting to a 1x CS access network. The E-UTRAN L1 unit and the 1x CS access network L1 unit are based on lower-level protocols in a radio interface, and their processing is controlled by the communication processing CPU of the mobile radio terminal 1.

The storage unit 40 includes a hard disk drive (HDD) and a flash memory device, which is an electrically rewritable and erasable nonvolatile memory. The storage unit 40 stores various application programs executed by the CPUs of the control unit 39, various data groups, control programs and control data of the mobile radio terminal 1, and identification information uniquely assigned to the mobile radio terminal 1 or the user. The storage unit 40 also stores phonebook data containing names and phone numbers associated with each other, data obtained by data communication, and downloaded data. On the basis of an output from batteries 45, a power supply circuit 46 generates a predetermined operation power supply voltage Vcc and supplies the generated voltage to each circuit unit. The mobile radio terminal 1 has the clock circuit (timer) 47 for measuring the current time.

The E-UTRAN intermittent-reception-clock generating unit 43 generates an E-UTRAN intermittent reception clock for intermittent reception if the mobile radio terminal 1 performs synchronization with an E-UTRAN and monitoring incoming call information notified to the mobile radio terminal 1. The E-UTRAN intermittent-reception-clock generating unit 43 outputs the generated E-UTRAN intermittent reception clock to the control unit 39.

The CS-access-network synchronization-clock generating unit 44 generates a CS-access-network synchronization clock serving as a reference of wake-up timing for acquiring synchronization with a CS access network method (e.g., 1x CS access network method). The CS-access-network synchronization-clock generating unit 44 outputs the generated CS-access-network synchronization clock to the control unit 39.

The mobile radio terminal 1 includes the reception amplifier 35, a speaker 36 that outputs an amplified reception audio signal, the transmission amplifier 37, a microphone 38 that inputs a transmission audio signal, the operation unit 41 that accepts requests from the user, and the display unit 42 that displays an image based on reception data.

Figure 7:
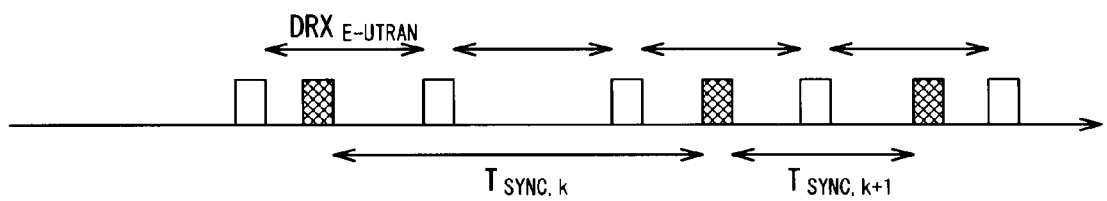
FIG. 7 illustrates a 1x CS access network synchronization acquisition operation performed in the mobile radio terminal of FIG. 6 while the mobile radio terminal is on standby in an E-UTRAN.

FIG. 7 illustrates a 1x CS access network synchronization acquisition operation performed in the mobile radio terminal 1 of FIG. 6 to acquire synchronization with a 1x CS access network while the mobile radio terminal 1 is on standby in an E-UTRAN. The mobile radio terminal 1 according to the present invention performs a standby operation in an E-UTRAN. To maintain synchronization with an E-UTRAN base station and to monitor incoming calls, the E-UTRAN L1 unit of the communication controller 39a performs E-UTRAN intermittent wake-up to perform E-UTRAN intermittent reception in intermittent reception cycles ($DRX_{E-UTRAN}$) specified by the E-UTRAN. At the same time, in order to maintain synchronization with a 1x CS access network, the 1x CS access network L1 unit of the communication controller 39a performs 1x CS access network synchronization acquisition wake-up in intervals between intermittent reception operations (intermittent wake-up operations) in the E-UTRAN.

Figure 8:
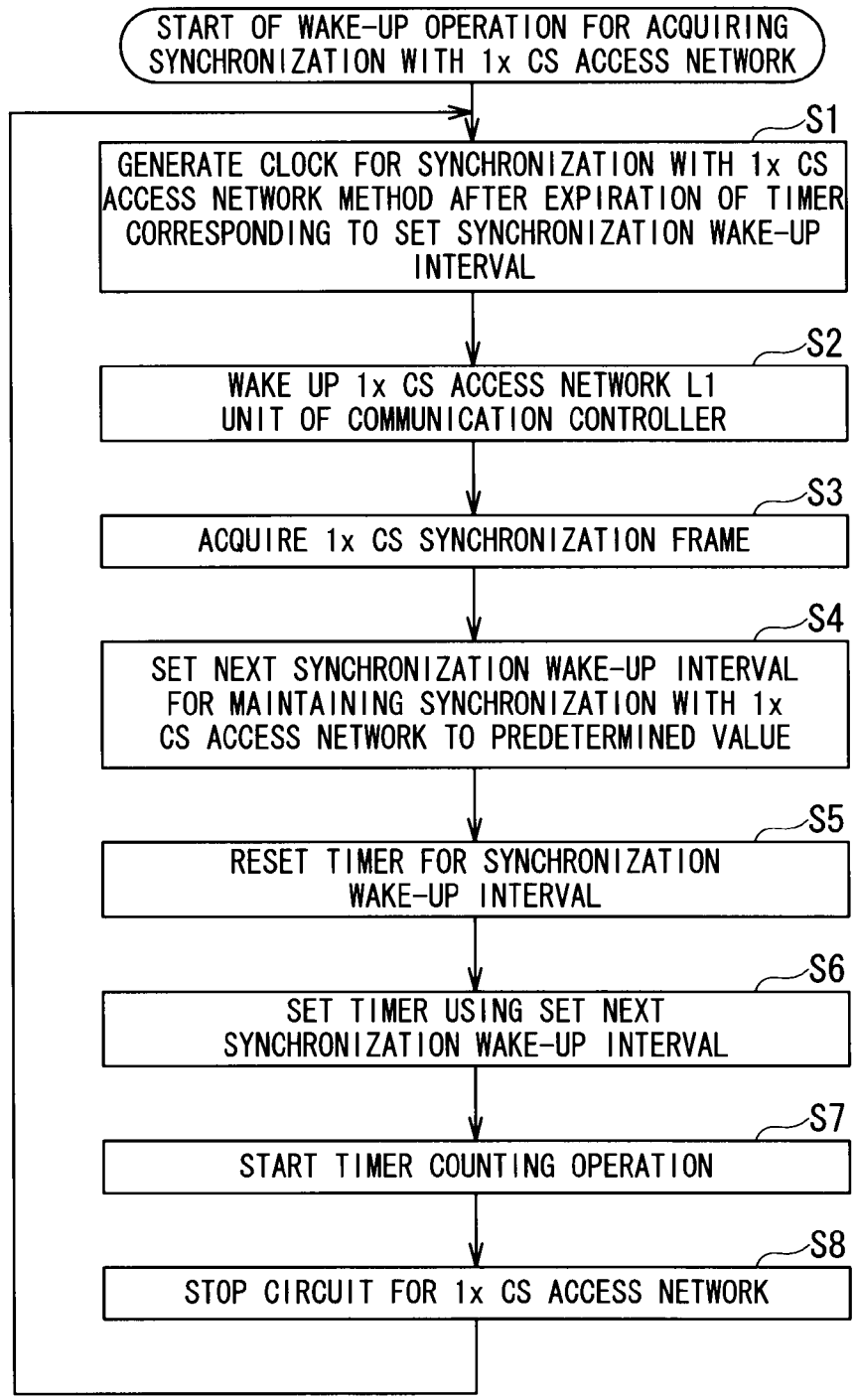
FIG. 8 is a flowchart further illustrating the 1x CS access network synchronization acquisition operation performed in the mobile radio terminal of FIG. 6 while the mobile radio terminal is on standby in the E-UTRAN.

With reference to the flowchart of FIG. 8, a further description will be given about the 1x CS access network synchronization acquisition operation performed in the mobile radio terminal 1 of FIG. 6 while the mobile radio terminal 1 is on standby in the E-UTRAN. In step S1, if a timer set by the clock circuit 47 expires, the CS-access-network synchronization-clock generating unit 44 generates a CS-access-network synchronization clock serving as a reference of wake-up timing for acquiring synchronization with a 1x CS access network method, and outputs the generated CS-access-network synchronization clock to the control unit 39. In step S2, on the basis of the CS-access-network synchronization clock from the CS-access-network synchronization-clock generating unit 44, the 1x CS access network L1 unit of the communication controller 39a performs 1x CS access network synchronization acquisition wake-up to maintain synchronization with the 1x CS access network. In step S3, the 1x CS access network L1 unit of the communication controller 39a controls the radio transmission/reception unit 32 and the signal processing unit 33 to acquire synchronization of radio frames transmitted from a 1x CS access network base station BS, and acquires a synchronization frame (i.e., a radio frame on a Sync channel in the case of the 1x CS access network). Thus, synchronization with the 1x CS access network can be maintained.

In step S4, the 1x CS access network L1 unit of the communication controller 39a sets the next synchronization wake-up interval for maintaining synchronization with the 1x CS access network to a predetermined value (fixed value). In step S5, the 1x CS access network L1 unit of the communication controller 39a uses the clock circuit 47 to reset a synchronization wake-up interval timer. In step S6, the 1x CS access network L1 unit of the communication controller 39a uses the next synchronization wake-up interval set in step S4 to set the synchronization wake-up interval timer in the clock circuit 47. In step S7, the clock circuit 47 starts a counting operation of the set synchronization wake-up interval timer. In step S8, the 1x CS access network L1 unit of the communication controller 39a controls the radio transmission/reception unit 32 and the signal processing unit 33 to stop a circuit for the 1x CS access network. At the same time, the 1x CS access network L1 unit of the communication controller 39a enters Sleep mode. Then, the process returns to step S1 and the following steps are repeated.

Unlike the E-UTRAN intermittent wake-up for monitoring incoming calls, the 1x CS access network synchronization acquisition wake-up is a wake-up operation performed to acquire synchronization with a base station of the 1x CS access network for the purpose of maintaining synchronization with the 1x CS access network. Therefore, regardless of incoming-call notification cycles of the 1x CS access network, wake-up operations can be performed in unique cycles of the mobile radio terminal 1 to maintain synchronization with the 1x CS access network. That is, in the processing for synchronization with the 1x CS access network, the wake-up operations do not have to be performed in intermittent reception cycles ($DRX_{1x\ CS}$) specified by the 1x CS access network, and can be performed in any cycles. Therefore, as illustrated in FIG. 7, when a wake-up interval ($T_{SYNC,\ k}$) for maintaining synchronization with the 1x CS access network is reset at the time of each 1x CS access network synchronization acquisition wake-up operation, the 1x CS access network synchronization acquisition wake-up operations can be performed at different wake-up intervals. That is, $T_{SYNC,\ k} \neq T_{SYNC,\ k+1}$ can be permitted. Although intermittent wake-up processing for the purpose of maintaining synchronization with a UTRAN may take place, the wake-up interval ($T_{SYNC,\ k}$) can be set to a maximum value, as long as the mobile radio terminal 1 can maintain synchronization with the 1x CS access network. Therefore, power consumption necessary for synchronization with the 1x CS access network can be minimized.

Hereinafter, a method for correcting a wake-up interval for maintaining synchronization with the 1x CS access network will be described. The mobile radio terminal 1 according to the present invention is capable of adaptively changing the timing of synchronization acquisition wake-up. When performing synchronization acquisition wake-up to acquire synchronization of radio frames transmitted from the 1x CS access network base station BS, the 1x CS access network L1 unit of the communication controller 39a acquires a synchronization frame (i.e., a radio frame on a Sync channel in the case of the 1x CS access network). However, drift in the internal clock of the mobile radio terminal 1 may cause an error with respect to a boundary between radio frames transmitted from the actual 1x CS access network base station BS. Therefore, this error is corrected when the 1x CS access network L1 unit acquires frame synchronization at the time of synchronization acquisition wake-up. If the error is greater than or equal to a predetermined threshold value (Max_sync_diff), it is determined that the error calculated from the internal clock of the mobile radio terminal 1 is large. Thus, the next synchronization acquisition wake-up interval (intermittent wake-up cycle) is set to be reduced. On the other hand, if the error is smaller than a predetermined threshold value (Min_sync_diff), it is determined that the current synchronization acquisition wake-up interval (intermittent wake-up cycle) based on the internal clock of the mobile radio terminal 1 allows adequate synchronization with the 1x CS access network. Thus, the next synchronization acquisition wake-up interval (intermittent wake-up cycle) is set to be increased. If the error falls within a range between the threshold value (Max_sync_diff) and the threshold value (Min_sync_diff), the current synchronization acquisition wake-up interval is maintained. Thus, while maintaining adequate synchronization with the 1x CS access network, it is possible to reduce power consumption of the mobile radio terminal 1. Hereinafter, a detailed description will be given about a 1x CS access network synchronization acquisition operation in which a wake-up interval for maintaining synchronization with the 1x CS access network is appropriately changed while the mobile radio terminal 1 is on standby in the E-UTRAN.

Figure 9:
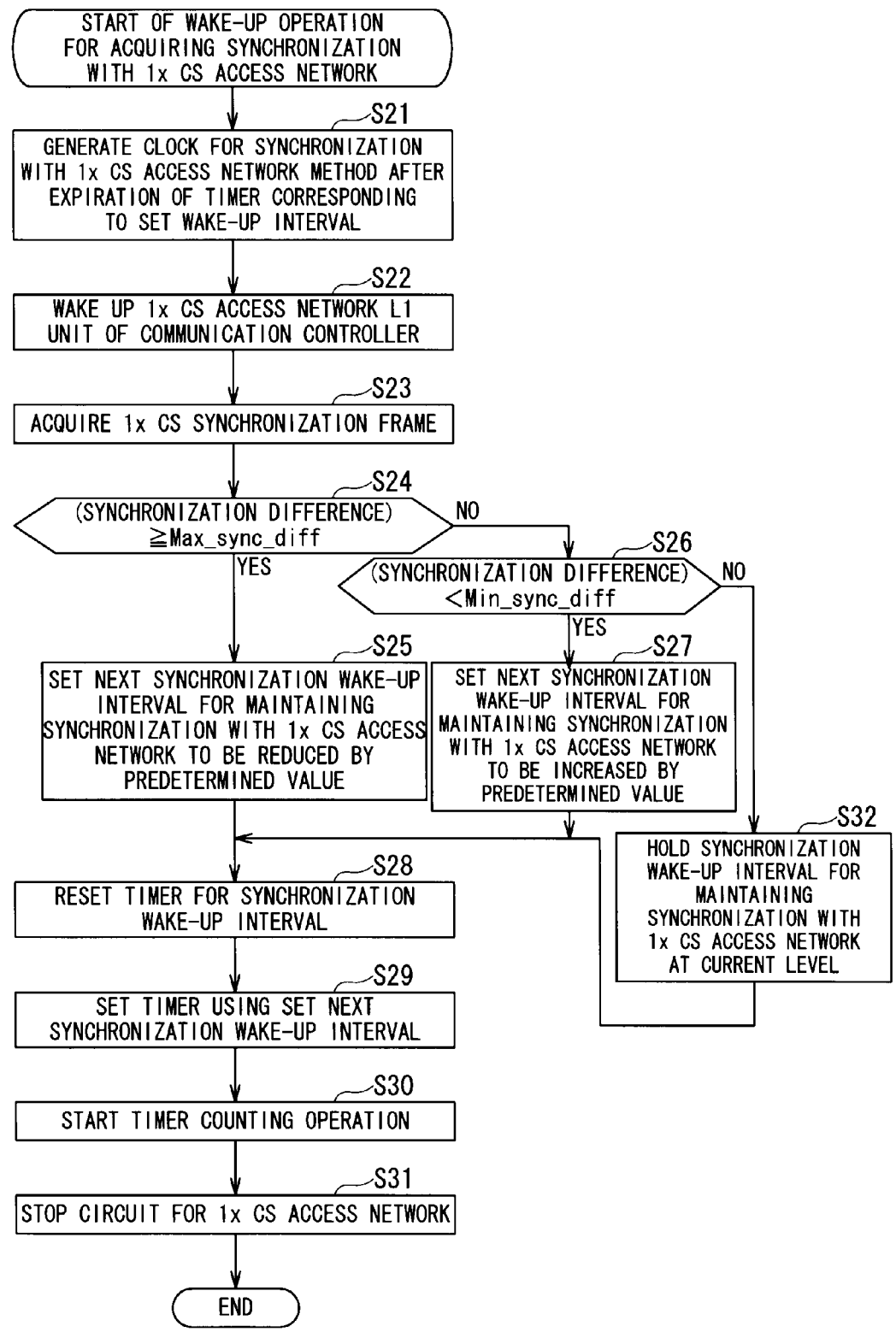
FIG. 9 is a flowchart illustrating a detail of a 1x CS access network synchronization acquisition operation in which, in the mobile radio terminal of FIG. 6, a wake-up interval for maintaining synchronization with a 1x CS access network is appropriately changed while the mobile radio terminal is on standby in the E-UTRAN.

With reference to the flowchart of FIG. 9, a detailed description will be given about a 1x CS access network synchronization acquisition operation in which, in the mobile radio terminal 1 of FIG. 6, a wake-up interval for maintaining synchronization with the 1x CS access network is appropriately changed while the mobile radio terminal 1 is on standby in the E-UTRAN. Steps S21 to S23 and steps S28 to S31 of FIG. 9 are the same as steps S1 to S3 and steps S5 to S8 of FIG. 8, and thus will not be described here to avoid repetition.

After the 1x CS access network L1 unit of the communication controller 39a acquires a synchronization frame in step S23, the process proceeds to step S24. In step S24, the 1x CS access network L1 unit of the communication controller 39a determines whether an error (i.e., "synchronization difference") between a boundary of radio frames transmitted from the actual 1x CS access network base station BS and the acquired synchronization frame is greater than or equal to a predetermined threshold value (Max_sync_diff). If the 1x CS access network L1 unit of the communication controller 39a determines in step S24 that the synchronization difference is greater than or equal to the threshold value (Max_sync_diff) (YES in step S24), the process proceeds to step S25. In step S25, the 1x CS access network L1 unit of the communication controller 39a determines that the error calculated from the internal clock of the mobile radio terminal 1 is large, and sets the next synchronization acquisition wake-up interval (intermittent wake-up cycle) for maintaining synchronization with the 1x CS access network to be reduced by a predetermined value. Then, the process proceeds to step S28.

If the 1x CS access network L1 unit of the communication controller 39a determines in step S24 that the synchronization difference is smaller than the threshold value (Max_sync_diff) (NO in step S24), the process proceeds to step S26. In step S26, the 1x CS access network L1 unit of the communication controller 39a determines whether the synchronization difference is smaller than a predetermined threshold value (Min_sync_diff). If the 1x CS access network L1 unit of the communication controller 39a determines in step S26 that the synchronization difference is smaller than the predetermined threshold value (Min_sync_diff) (YES in step S26), the process proceeds to step S27. In step S27, the 1x CS access network L1 unit of the communication controller 39a determines that the current synchronization acquisition wake-up interval based on the internal clock of the mobile radio terminal 1 allows adequate synchronization with the 1x CS access network. Thus, in order to further reduce the power consumption of the mobile radio terminal 1, the 1x CS access network L1 unit of the communication controller 39a sets the next synchronization acquisition wake-up interval (intermittent wake-up cycle) for maintaining synchronization with the 1x CS access network to be increased. Then, the process proceeds to step S28.

If the 1x CS access network L1 unit of the communication controller 39a determines in step S26 that the synchronization difference is greater than or equal to the predetermined threshold value (Min_sync_diff) (NO in step S26), the process proceeds to step S32. In step S32, the 1x CS access network L1 unit of the communication controller 39a determines that the current synchronization acquisition wake-up interval based on the internal clock of the mobile radio terminal 1 allows synchronization with the 1x CS access network to be maintained within an acceptable range. Thus, the 1x CS access network L1 unit of the communication controller 39a maintains the current synchronization acquisition wake-up interval, and sets the current synchronization acquisition wake-up interval as the next synchronization acquisition wake-up interval. Then, the process proceeds to step S28.

In the present embodiment, two predetermined threshold values (Max_sync_diff and Min_sync_diff) are used to maintain, reduce, or increase the synchronization acquisition wake-up interval. However, more than two threshold values may be used to reduce or increase the synchronization acquisition wake-up interval more minutely (at many different levels). Thus, it is possible to reduce power consumption of the mobile radio terminal 1 while maintaining synchronization with the 1x CS access network.

As described above, in the present embodiment, even when the mobile radio terminal 1 is on standby in the E-UTRAN, it is possible to reduce processing time at the start of a CS service. Hereinafter, the effect of improvement achieved by the present invention will be described with reference to FIG. 10.

Figure 10:
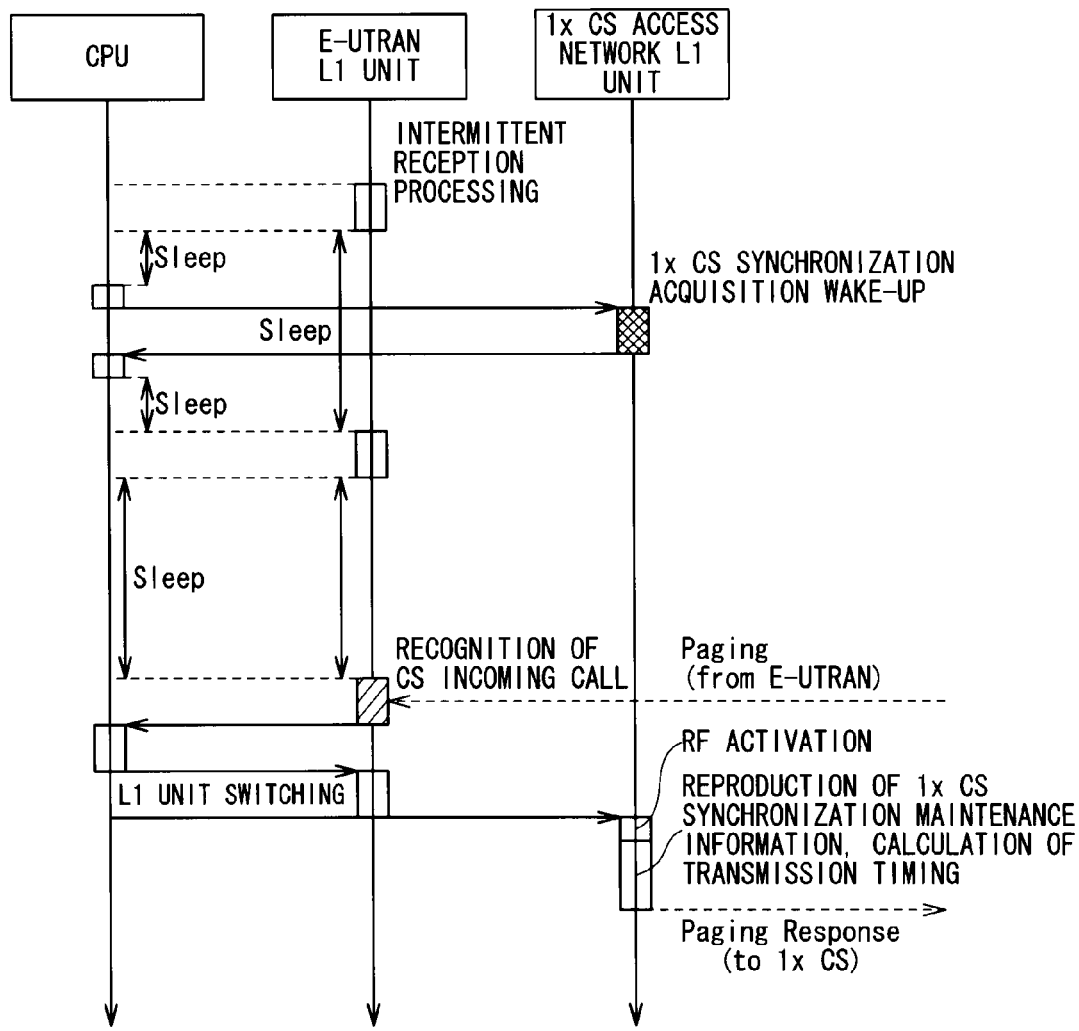
FIG. 10 illustrates sequential processing performed in the mobile radio terminal of FIG. 6 when the mobile radio terminal receives a notification of a CS incoming call (Paging) while being on standby in the E-UTRAN.

FIG. 10 illustrates sequential processing performed in the mobile radio terminal 1 when the mobile radio terminal 1 receives a notification of a CS incoming call (Paging) while being on standby in the E-UTRAN. As illustrated in FIG. 10, in an interval between intermittent reception operations in the E-UTRAN, the communication processing CPU of the communication controller 39a activates the 1x CS access network L1 unit to maintain synchronization with the 1x CS access network. With synchronization with the 1x CS access network maintained, if a notification of a CS incoming call (Paging) is received in the 1x CS access network, the communication processing CPU of the communication controller 39a activates the 1x CS access network L1 unit, as in the case of the method of the related art. Information about a 1x CS access network base station to which a response is to be transmitted and transmission frame timing are already acquired in the 1x CS access network synchronization acquisition wake-up operation described with reference to FIG. 8 or FIG. 9. Therefore, after activation and setting of an RF circuit for transmission to the 1x CS access network base station, without performing a series of processing operations including searching for the 1x CS access network base station BS and reception of notification information, a Paging response can be returned to the 1x CS access network only by reproducing information about maintained synchronization with the 1x CS access network and calculating transmission timing.

According to the present embodiment, it is possible to reduce time between reception of Paging and transmission of a Paging response. It is thus possible to reduce waiting time on the network side. At the same time, it is possible to reduce response time of a party from which the incoming call on the mobile radio terminal 1 originates. Therefore, when the mobile radio terminal 1 receives a CS service event via the E-UTRAN while being on standby in the E-UTRAN, the mobile radio terminal 1 can efficiently return a response to the received event to the CS access network.

In the above description, the 1x CS access network has been discussed as a target where CS Fallback setting is made. The present invention is also applicable to a mobile communication network (e.g., a UTRAN and a GERAN) also having a CS access network.

Second Embodiment

Figure 11:
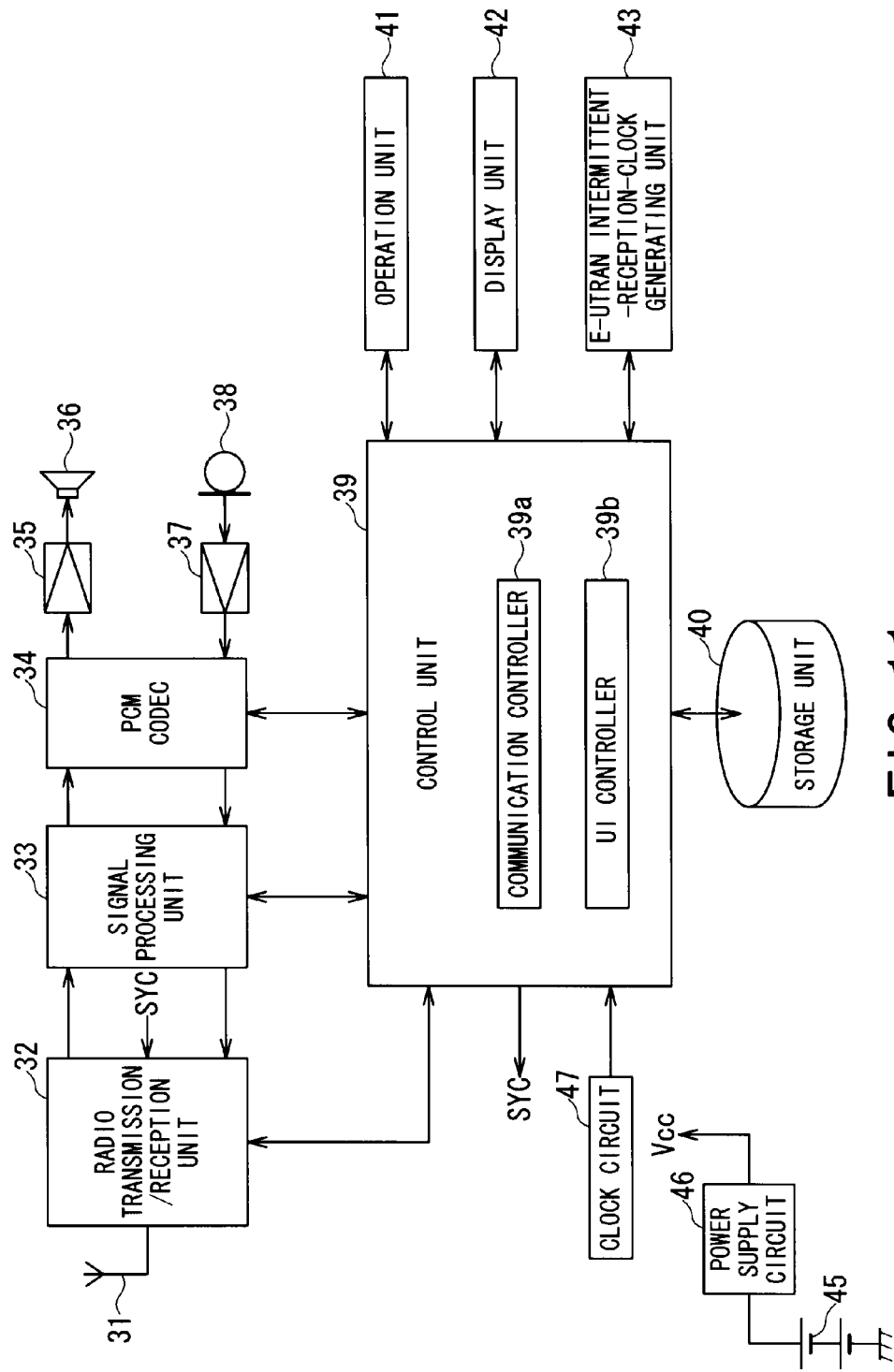
FIG. 11 is a block diagram illustrating an internal configuration of a mobile radio terminal according to a second embodiment of the present invention.

FIG. 11 illustrates an internal configuration of a mobile radio terminal 1 according to a second embodiment of the present invention. Unlike the first embodiment, in the mobile radio terminal 1 of the second embodiment, a clock generating unit that generates an internal clock of the mobile radio terminal 1 for controlling intermittent reception is that for the E-UTRAN only. That is, the mobile radio terminal 1 of the second embodiment includes an E-UTRAN intermittent-reception-clock generating unit 43 to perform intermittent reception for synchronization with the E-UTRAN and monitoring incoming call information notified to the mobile radio terminal 1. In the second embodiment, the timing of acquisition of synchronization with the 1x CS access network is calculated by counting intermittent reception cycles ($DRX_{E\text{-}UTRAN}$) of the E-UTRAN. That is, through the use of generation of an E-UTRAN intermittent reception clock, a clock necessary to calculate a synchronization acquisition interval for acquiring synchronization with the 1x CS access network is generated, and synchronization acquisition wake-up timing on the 1x CS access network side is calculated by the clock on the E-UTRAN side. Therefore, the circuit for the 1x CS access network is not activated, except at the time of synchronization acquisition including the time of timer counter operation for synchronization acquisition. The configuration of FIG. 11 is basically the same as that of FIG. 6, and will not be described here to avoid repetition.

Next, with reference to FIG. 12 to FIG. 14, a description will be given about a method in which the circuit for the 1x CS access network is driven for maintaining synchronization with the 1x CS access network, only through clock control on the E-UTRAN side. The method is based on the assumption that synchronization between base stations is achieved both in the E-UTRAN and the 1x CS access network.

Figure 12:
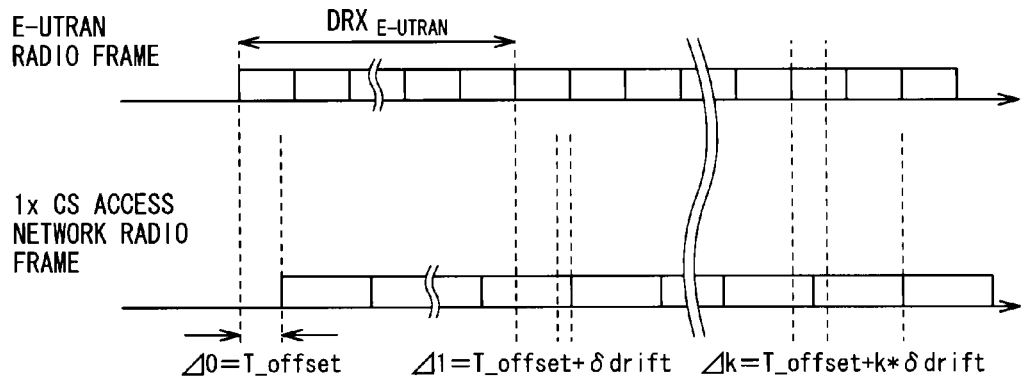
FIG. 12 illustrates a relationship between radio frames of the E-UTRAN and radio frames of the 1x CS access network.

FIG. 12 illustrates a relationship between radio frames of the E-UTRAN and radio frames of the 1x CS access network. Between the E-UTRAN and the 1x CS access network, there are not only timing differences (T_offset) on frame boundaries, but also constant clock differences (δ drift) that occur because different clocks are used for time measurement in these access networks. As illustrated in FIG. 12, since δ drift is a constant deviation, the total value of δ drift increases with time. Therefore, when the mobile radio terminal 1 that is on standby in the E-UTRAN uses an E-UTRAN intermittent reception clock generated by the E-UTRAN intermittent-reception-clock generating unit 43 to maintain synchronization with the 1x CS access network, the synchronization with the 1x CS access network may be lost by an increase in total value of δ drift. On the basis of this, the mobile radio terminal 1 uses the E-UTRAN intermittent reception clock to synchronize with the 1x CS access network.

Figure 13:
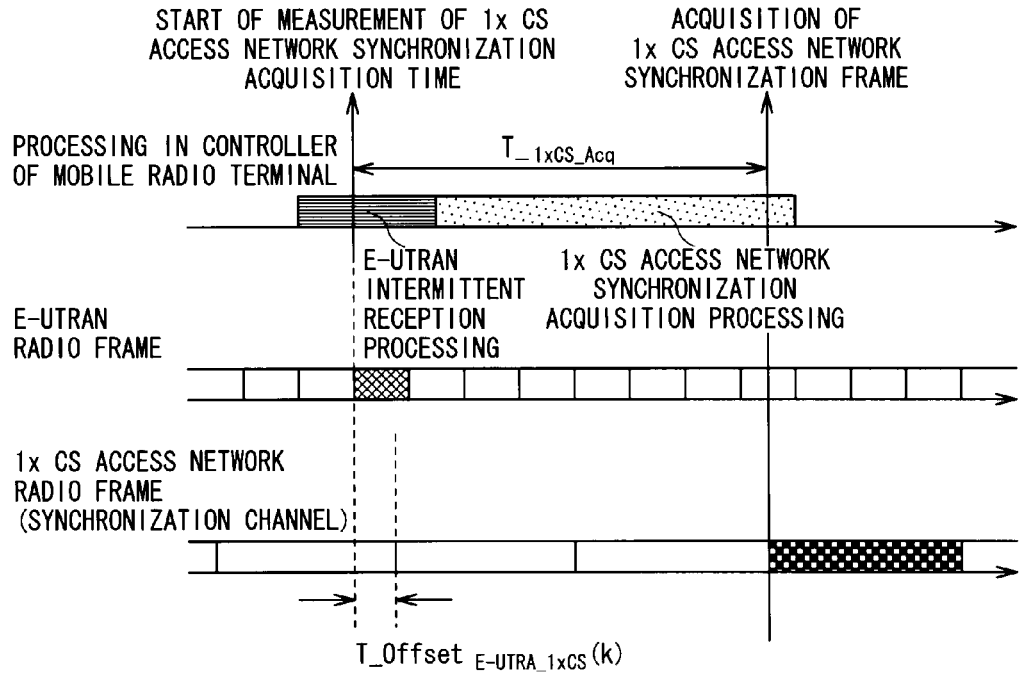
FIG. 13 illustrates a method of measuring a radio frame offset and the amount of drift between the E-UTRAN and the 1x CS access network.
Figure 14:
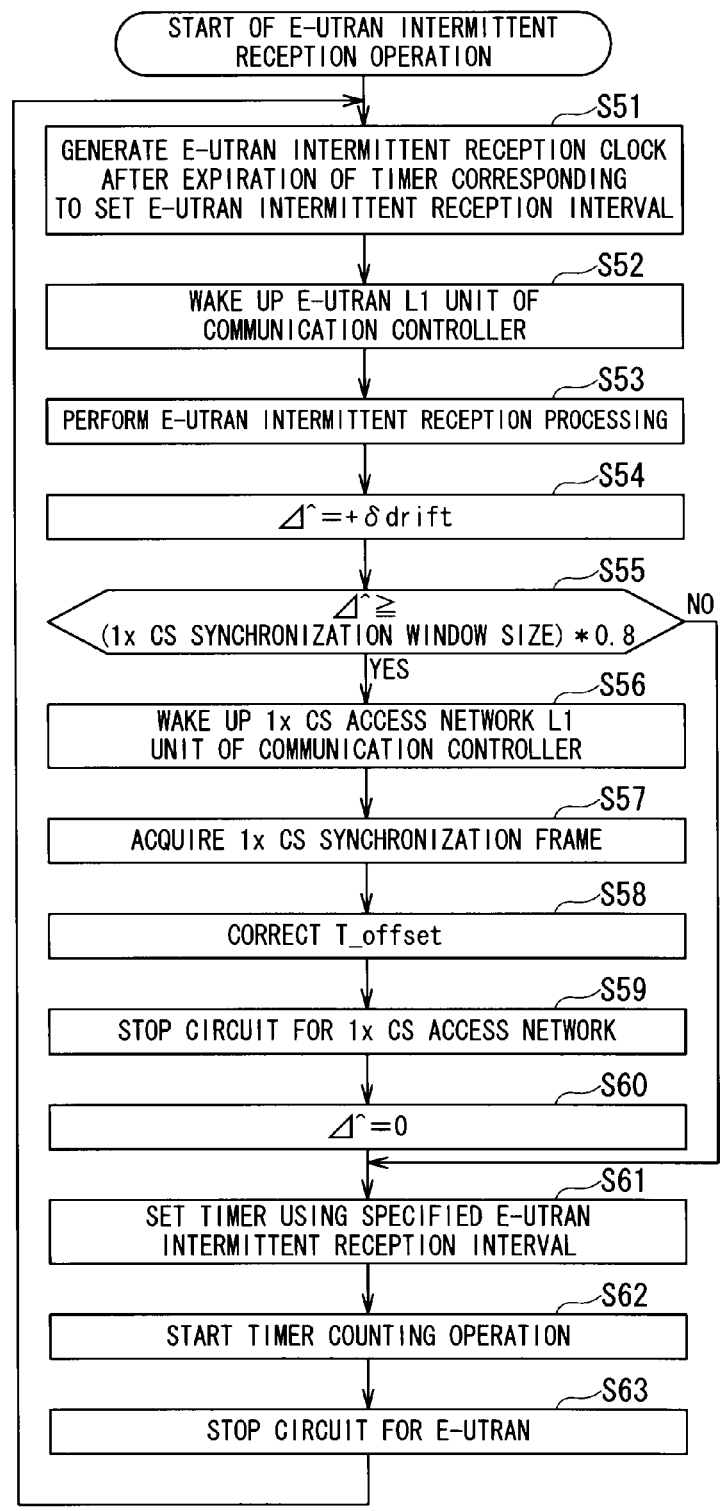
FIG. 14 is a flowchart illustrating a detail of an E-UTRAN intermittent reception operation performed in the mobile radio terminal of FIG. 6 while the mobile radio terminal is on standby in the E-UTRAN.

FIG. 13 illustrates a method of measuring a radio frame offset and the amount of drift between the E-UTRAN and the 1x CS access network. The value of δ drift is calculated from the frame offset T_offset between the E-UTRAN and the 1x CS access network. Therefore, T_offset is calculated first. To calculate T_offset, an E-UTRAN frame boundary time is stored at the time of E-UTRAN intermittent reception. Then, time (T__1x CSAcq) between the stored E-UTRAN frame boundary time and the leading end of a synchronization channel frame at the time of acquisition of synchronization with the 1x CS access network is measured. When synchronization with the 1x CS access network is not acquired, a plurality of 1x CS synchronization channel frames extends beyond the time T__1x CSAcq as illustrated in FIG. 13. In view of this, the offset T_offset between an E-UTRAN frame boundary and a 1x CS access network frame boundary can be calculated by Equation 1 below:

$$T\_offset = T\_1x\,CS\text{-}Acq \bmod (1x\,CS\,\text{access network synchronization channel frame length}) \quad [\text{Equation 1}]$$

In Equation 1, if T_offset measured at a given time is expresses as T_offset(k), δ drift can be expressed by Equation 2 below, using values measured for the (k−1)-th time and the k-th time:

$$\delta\,\text{drift} = T\_offset(k) - T\_offset(k-1) \quad [\text{Equation 2}]$$

In Equation 2, an E-UTRAN intermittent reception interval ($DRX_{E\text{-}UTRAN}$) is used as the interval between the (k−1)-th measurement and the k-th measurement. From the elapsed time from the previous synchronization with the 1x CS access network to the present, the estimated amount of drift $\hat{\Delta}$ can be calculated by Equation 3 below:

$$\hat{\Delta} = (\text{Elapsed time from the previous 1x CS synchronization}) \cdot \delta\,\text{drift}/DRX_{E\text{-}UTRAN} \quad [\text{Equation 3}]$$

A determination as to whether to acquire synchronization with the 1x CS access network can be made on the basis of $\hat{\Delta}$. Hereinafter, a detailed description will be given about an E-UTRAN intermittent reception operation performed, using this method, when the mobile radio terminal 1 is on standby in the E-UTRAN.

With reference to the flowchart of FIG. 14, a detailed description will be given about an E-UTRAN intermittent reception operation performed when the mobile radio terminal 1 of FIG. 6 is on standby in the E-UTRAN.

In step S51, when a timer corresponding to an E-UTRAN intermittent reception interval set by the clock circuit 47 expires, the E-UTRAN intermittent-reception-clock generating unit 43 generates an E-UTRAN intermittent reception clock for intermittent reception performed for synchronization with the E-UTRAN and monitoring incoming call information notified to the mobile radio terminal 1. The E-UTRAN intermittent-reception-clock generating unit 43 outputs the generated E-UTRAN intermittent reception clock to the control unit 39. In step S52, on the basis of the E-UTRAN intermittent reception clock from the E-UTRAN intermittent-reception-clock generating unit 43, the E-UTRAN L1 unit of the communication controller 39a performs intermittent wake-up for monitoring incoming calls in the E-UTRAN. In step S53, the E-UTRAN L1 unit of the communication controller 39a controls the radio transmission/reception unit 32 and the signal processing unit 33 to perform E-UTRAN intermittent reception. Here, the E-UTRAN L1 unit of the communication controller 39a measures a difference (T_offset)

between radio frame boundaries of the E-UTRAN and the 1x CS access network to calculate δ drift.

In step S54, when performing E-UTRAN intermittent wake-up, the E-UTRAN L1 unit of the communication controller 39a increments Δ^ by δ drift (i.e., Δ^ at the present E-UTRAN intermittent reception=Δ^ at the previous E-UTRAN intermittent reception+δ drift). In step S55, the E-UTRAN L1 unit of the communication controller 39a determines whether to acquire synchronization with the 1x CS access network. Specifically, the E-UTRAN L1 unit of the communication controller 39a determines whether Δ^ has reached, for example, 80% of a synchronization window for acquiring synchronization with the 1x CS access network. If it is determined in step S55 that Δ^ has fallen outside the synchronization window, synchronization with the 1x CS access network is lost and cannot be maintained. Therefore, a smaller synchronization window is used as a threshold value for determining whether to acquire synchronization. Alternatively, a determination as to whether Δ^ has reached, for example, 70% of the synchronization window for acquiring synchronization with the 1x CS access network may be made in step S55.

If the E-UTRAN L1 unit of the communication controller 39a determines in step S55 that Δ^ has reached 80% of the synchronization window for acquiring synchronization with the 1x CS access network (YES in step S55), the process proceeds to step S56. In step S56, in accordance with an instruction from the E-UTRAN L1 unit of the communication controller 39a, the 1x CS access network L1 unit of the communication controller 39a performs 1x CS access network synchronization acquisition wake-up. In step S57, the 1x CS access network L1 unit of the communication controller 39a controls the radio transmission/reception unit 32 and the signal processing unit 33 to acquire synchronization of radio frames transmitted from the 1x CS access network base station BS, and acquires a synchronization frame (i.e., a radio frame on a Sync channel in the case of the 1x CS access network). Thus, synchronization with the 1x CS access network can be maintained.

In step S58, the E-UTRAN L1 unit of the communication controller 39a corrects and updates an offset T_offset between an E-UTRAN radio frame and a 1x CS access network synchronization channel frame. In step S59, the 1x CS access network L1 unit of the communication controller 39a controls the radio transmission/reception unit 32 and the signal processing unit 33 to stop the circuit for the 1x CS access network. At the same time, the 1x CS access network L1 unit of the communication controller 39a enters Sleep mode. Since δ drift is corrected in the processing described above, the E-UTRAN L1 unit of the communication controller 39a resets Δ^ (Δ^=0) in step S60. In step S61, the E-UTRAN L1 unit of the communication controller 39a uses a intermittent reception cycle ($DRX_{E-UTRAN}$) specified by the E-UTRAN to set a timer for E-UTRAN intermittent reception. In step S62, the clock circuit 47 starts a counting operation of the E-UTRAN intermittent reception timer set in step S61. In step S63, the E-UTRAN L1 unit of the communication controller 39a controls the radio transmission/reception unit 32 and the signal processing unit 33 to stop the circuit for the E-UTRAN. At the same time, the E-UTRAN L1 unit of the communication controller 39a enters Sleep mode.

If the E-UTRAN L1 unit of the communication controller 39a determines in step S55 that Δ^ has not reached 80% of the synchronization window for acquiring synchronization with the 1x CS access network (NO in step S55), the E-UTRAN L1 unit of the communication controller 39a determines that it is not necessary to acquire synchronization with the 1x CS access network, and thus does not acquire synchronization with the mobile radio terminal 1. The process then proceeds to step S61. The intermittent reception processing is completed by performing only the E-UTRAN intermittent reception. The E-UTRAN L1 unit of the communication controller 39a stops the circuit for the E-UTRAN and enters Sleep mode. Since it is determined in step S55 that Δ^ has not reached 80% of the synchronization window for acquiring synchronization with the 1x CS access network, Δ^ is repeatedly incremented in step S54 until it is determined that Δ^ has reached 80% of the synchronization window for acquiring synchronization with the 1x CS access network.

In the present embodiment, since synchronization wake-up timing on the 1x CS access network side is generated, it is not necessary to have a timer for the 1x CS access network. This makes it possible to provide the mobile radio terminal 1 having a simple configuration. Moreover, since the operation of the circuit for the 1x CS access network can be stopped until it is determined that synchronization with the 1x CS access network is necessary, the power consumption of the mobile radio terminal 1 can be reduced.

Figure 15:
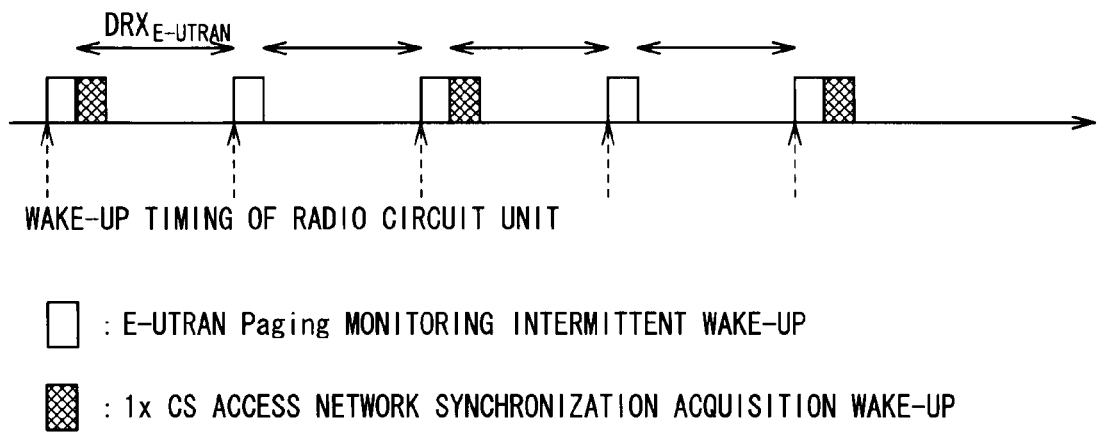
FIG. 15 illustrates an E-UTRAN intermittent wake-up operation and an operation for acquiring synchronization with the 1x CS access network that are temporally successively performed.

If the mobile radio terminal 1 has a configuration in which the radio transmission/reception unit 32 is shared by the 1x CS access network and the E-UTRAN, processing for acquiring synchronization with the 1x CS access network may be performed successively to E-UTRAN intermittent wake-up. As illustrated in FIG. 15, E-UTRAN intermittent wake-up and processing for acquiring synchronization with the 1x CS access network can be realized by activating the radio transmission/reception unit 32 once. Thus, it is possible to reduce power consumption associated with activation of the radio transmission/reception unit 32.

The second embodiment of the present invention is based on the assumption that although synchronization between base stations is achieved both in the E-UTRAN and the 1x CS access network, there is drift in radio frame between systems, because clocks held by the E-UTRAN and the 1x CS access network are different from each other. Therefore, even when the E-UTRAN base station where the mobile radio terminal 1 is on standby is changed (reselected), if the amount of drift is measured once while the mobile radio terminal 1 is on standby in the E-UTRAN base station, it is possible to estimate and use the same amount of drift.

Figure 16:
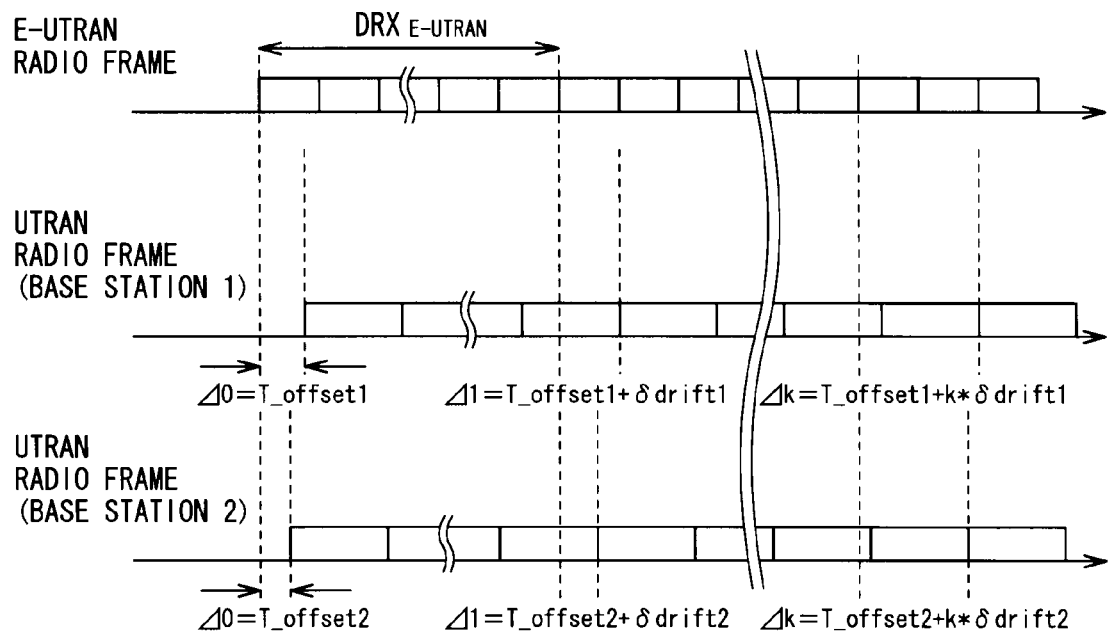
FIG. 16 illustrates a method of calculation of the amount of drift, the calculation being performed every time a UTRAN base station with which synchronization is to be acquired is changed.

This is not applicable to the case where a system (e.g., UTRAN (WCDMA system)) in which synchronization between base stations of a mobile communication network is not achieved is used as a CS access network. In this case, however, as illustrated in FIG. 16, synchronization with the UTRAN may be acquired by calculating the amount of drift (described with reference to FIG. 12 to FIG. 14) for every UTRAN base station, that is, every time the UTRAN base station with which synchronization is to be acquired is changed. When multicasting is not performed on the E-UTRAN side, the E-UTRAN may be configured not to allow synchronization between base stations. In this case, again, it is possible to acquire synchronization with the CS access network by calculating the amount of drift for every base station.

Third Embodiment

Figure 17:
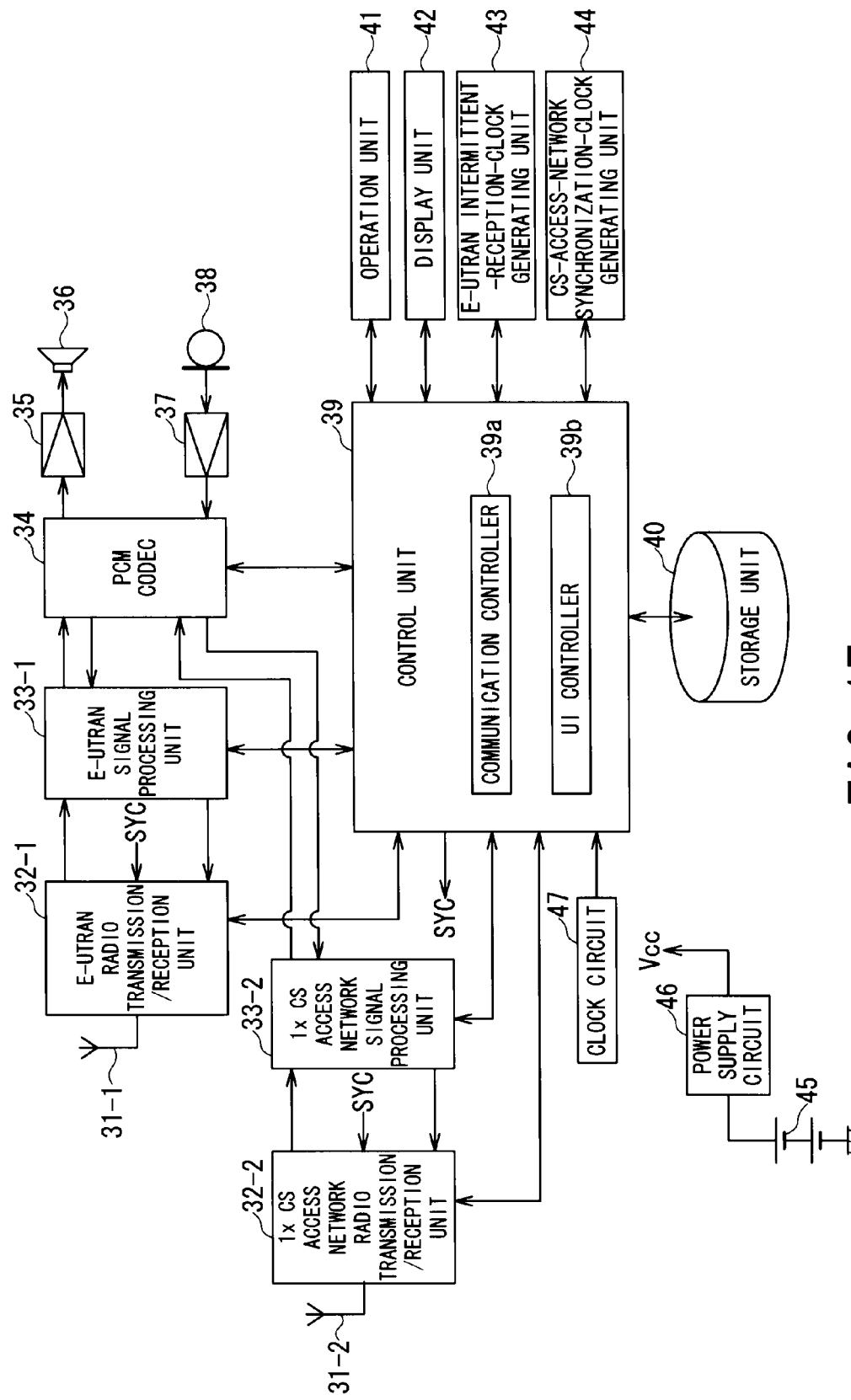
FIG. 17 is a block diagram illustrating a configuration of a mobile radio terminal according to a third embodiment of the present invention, the mobile radio terminal having different radio transmission/reception units and signal processing units for the E-UTRAN and the 1x CS access network.
Figure 18:
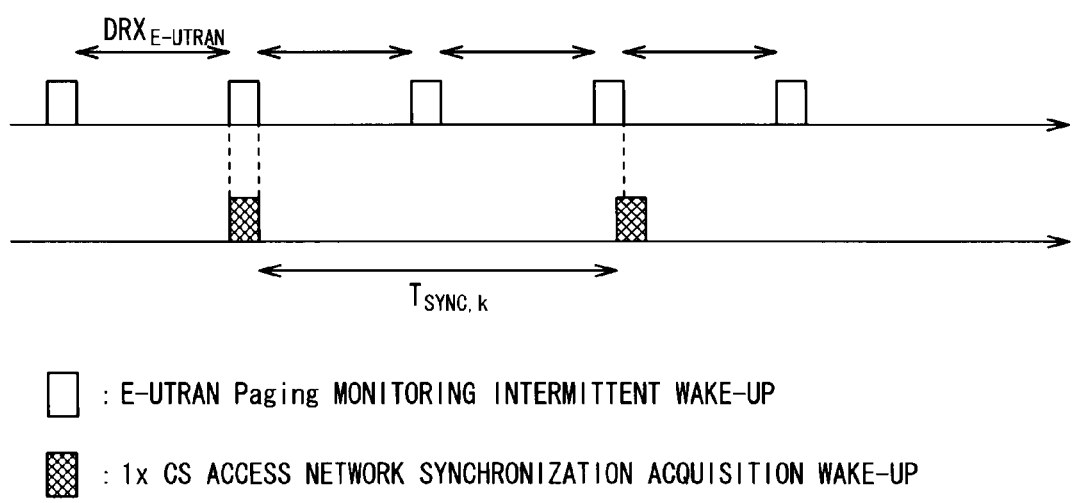
FIG. 18 illustrates processing performed for acquiring synchronization with the 1x CS access network while E-UTRAN intermittent reception is performed.

FIG. 17 illustrates a configuration of a mobile radio terminal 1 having different radio transmission/reception units 32-1 and 32-2 for the E-UTRAN and the 1x CS access network, respectively, and different signal processing units 33-1 and 33-2 for the E-UTRAN and the 1x CS access network, respectively. In the case of the mobile radio terminal 1 of FIG. 17, processing for the E-UTRAN and the 1x CS access network can be performed simultaneously. For example, as illustrated in FIG. 18, processing for acquiring synchronization with the 1x CS access network can be performed while E-UTRAN intermittent reception is performed. Thus, it is possible to perform synchronization acquisition at any time when it is wanted to acquire synchronization with the 1x CS access network. Moreover, it is possible to start processing for incoming and outgoing calls from and to the 1x CS access network without having to wait for processing performed by the E-UTRAN radio transmission/reception unit 32-1 and the E-UTRAN signal processing unit 33-1. Therefore, it is possible to further reduce processing time.

According to the present invention, when a mobile radio terminal receives a CS service event via an E-UTRAN while being on standby in the E-UTRAN, the mobile radio terminal can transmit a response to the CS service event to a CS access network.

The series of processes described in the embodiments of the present invention can be performed either by software or hardware.

In the embodiments of the present invention described above, the steps in the flowcharts are performed sequentially in the described order. However, the steps may be performed simultaneously or individually, and do not necessarily have to be performed sequentially.

What is claimed is:

1. A mobile radio terminal comprising:
a circuit switching network transmission/reception unit configured to perform transmission and reception to and from a base station belonging to a circuit switching network, with use of a radio signal;
a mobile communication network transmission/reception unit configured to perform transmission and reception to and from a base station belonging to a mobile communication network, with use of the radio signal, the mobile communication network being connected to the circuit switching network and forming an integrated communication network together with the circuit switching network;
a control unit configured to activate the circuit switching network transmission/reception unit and control the circuit switching network transmission/reception unit so as to maintain synchronization with the base station belonging to the circuit switching network, if the mobile radio terminal is on standby in the base station belonging to the mobile communication network; and
a synchronization processing clock generating unit configured to generate a synchronization processing clock serving as a reference of timing for acquiring synchronization with the circuit switching network,
wherein the control unit activates the circuit switching network transmission/reception unit on the basis of the synchronization processing clock generated by the synchronization processing clock generating unit.

2. The mobile radio terminal according to claim 1, wherein if the mobile radio terminal is on standby in the base station belonging to the mobile communication network, while the mobile communication network transmission/reception unit performs intermittent reception processing in intermittent reception cycles specified by the mobile communication network, the control unit activates the circuit switching network transmission/reception unit and controls the circuit switching network transmission/reception unit so as to maintain synchronization with the base station belonging to the circuit switching network.

3. The mobile radio terminal according to claim 1, wherein if the mobile radio terminal is on standby in the base station belonging to the mobile communication network, the control unit activates the circuit switching network transmission/reception unit synchronously or asynchronously with intermittent reception cycles specified by the circuit switching network, and controls the circuit switching network transmission/reception unit so as to maintain synchronization with the base station belonging to the circuit switching network.

4. The mobile radio terminal according to claim 1, wherein the synchronization processing clock generating unit generates the synchronization processing clock at a synchronization interval set by the control unit in the previous processing for maintaining synchronization with the base station belonging to the circuit switching network.

5. The mobile radio terminal according to claim 4, wherein the control unit acquires, through the circuit switching network transmission/reception unit, a synchronization frame transmitted from the base station belonging to the circuit switching network, and determines whether an error between the synchronization frame and a boundary of radio frames transmitted from the base station belonging to the circuit switching network is within a predetermined range; and
the synchronization interval is variably set in accordance with the determination result determined by the control unit.

6. The mobile radio terminal according to claim 1, wherein the control unit activates the circuit switching network transmission/reception unit if an event from the circuit switching network occurs while the mobile radio terminal is on standby in the base station belonging to the mobile communication network; and
the circuit switching network transmission/reception unit transmits a response to the event to the base station belonging to the circuit switching network, the base station being a base station with which synchronization is maintained.

7. The mobile radio terminal according to claim 1, further comprising a mobile communication network intermittent reception clock generating unit configured to generate a mobile communication network intermittent reception clock for performing intermittent reception between the mobile radio terminal and the mobile communication network,
wherein the control unit activates the mobile communication network transmission/reception unit on the basis of the mobile communication network intermittent reception clock generated by the mobile communication network intermittent reception clock generating unit, and determines whether to acquire synchronization with the circuit switching network on the basis of the amount of difference between a radio frame of the mobile communication network and a radio frame of the circuit switching network, and if it is determined to acquire synchronization with the circuit switching network, the control unit activates the circuit switching network transmission/reception unit, and controls the circuit switching network transmission/reception unit so as to maintain synchronization with the base station belonging to the circuit switching network.

8. The mobile radio terminal according to claim 7, wherein the control unit determines whether to acquire synchronization with the circuit switching network by determining whether the amount of difference between a radio frame of the mobile communication network and a radio frame of the circuit switching network reaches a predetermined value of a synchronization window for acquiring synchronization with the circuit switching network.

9. The mobile radio terminal according to claim 7, wherein the control unit increments the amount of difference between a radio frame of the mobile communication network and a radio frame of the circuit switching network every time the mobile radio terminal performs intermittent reception between the mobile radio terminal and the mobile communication network.

10. The mobile radio terminal according to claim 8, wherein the control unit increments the amount of difference between a radio frame of the mobile communication network and a radio frame of the circuit switching network every time the mobile radio terminal performs intermittent reception between the mobile radio terminal and the mobile communication network.

11. The mobile radio terminal according to claim 7, wherein when base stations belonging to the circuit switching network synchronize with each other and base stations belonging to the mobile communication network synchronize with each other, if a base station in which the mobile radio terminal is on standby is changed from a first base station to a second base station belonging to the mobile communication network, the control unit controls the circuit switching network transmission/reception unit so as to maintain synchronization with the base station belonging to the circuit switching network, on the basis of the amount of difference between a radio frame of the mobile communication network and a radio frame of the circuit switching network, the amount of difference being obtained during intermittent reception between the mobile radio terminal and the first base station.

12. The mobile radio terminal according to claim 7, wherein when base stations belonging to the circuit switching network do not synchronize with each other, every time a base station in which the mobile radio terminal is on standby is changed, the control unit controls the circuit switching network transmission/reception unit so as to maintain synchronization with the base station belonging to the circuit switching network, on the basis of the amount of difference between a radio frame of the mobile communication network and a radio frame of the circuit switching network, the amount of difference being obtained during intermittent reception between the mobile radio terminal and the base station in which the mobile radio terminal is on standby after the change of base station.

13. The mobile radio terminal according to claim 7, wherein if base stations belonging to the mobile communication network do not synchronize with each other, every time a base station in which the mobile radio terminal is on standby is changed, the control unit controls the circuit switching network transmission/reception unit so as to maintain synchronization with the base station belonging to the circuit switching network, on the basis of the amount of difference between a radio frame of the mobile communication network and a radio frame of the circuit switching network, the amount of difference being obtained during intermittent reception between the mobile radio terminal and the base station in which the mobile radio terminal is on standby after the change of base station.

14. The mobile radio terminal according to claim 7, wherein the amount of difference between a radio frame of the mobile communication network and a radio frame of the circuit switching network includes the amount of difference in radio frame boundary between the mobile communication network and the circuit switching network, and the amount of drift that occurs between the radio frame of the mobile communication network and the radio frame of the circuit switching network.

15. The mobile radio terminal according to claim 1, wherein the circuit switching network transmission/reception unit and the mobile communication network transmission/reception unit are formed as a single unit; and
the control unit activates the circuit switching network transmission/reception unit successively to intermittent reception performed by the mobile communication network transmission/reception unit between the mobile radio terminal and the mobile communication network, and controls the circuit switching network transmission/reception unit so as to maintain synchronization with the base station belonging to the circuit switching network.

16. The mobile radio terminal according to claim 1, wherein the circuit switching network includes at least one of a UTRAN, a GERAN, and a cdma2000 1x CS access network.

17. The mobile radio terminal according to claim 1, wherein the circuit switching network transmission/reception unit and the mobile communication network transmission/reception unit are independently operable; and
a time period for synchronization acquisition processing performed by the circuit switching network transmission/reception unit between the mobile radio terminal and the circuit switching network partially or completely coincides with a time period for intermittent reception processing performed by the mobile communication network transmission/reception unit between the mobile radio terminal and the mobile communication network.

18. A mobile radio terminal comprising:
a circuit switching network transmission/reception unit configured to perform transmission and reception to and from a base station belonging to a circuit switching network including at least one of a UTRAN, a GERAN, and a cdma2000 1x CS access network, with use of a radio signal;
a mobile communication network transmission/reception unit configured to perform transmission and reception to and from a base station belonging to an E-UTRAN, with use of the radio signal, the E-UTRAN being connected to the circuit switching network and forming an integrated communication network together with the circuit switching network;
a control unit configured to activate the circuit switching network transmission/reception unit and control the circuit switching network transmission/reception unit so as to maintain synchronization with the base station belonging to the circuit switching network, if the mobile radio terminal is on standby in the base station belonging to the E-UTRAN; and
a synchronization processing clock generating unit configured to generate a synchronization processing clock serving as a reference of timing for acquiring synchronization with the circuit switching network,
wherein the control unit activates the circuit switching network transmission/reception unit on the basis of the synchronization processing clock generated by the synchronization processing clock generating unit.

19. The mobile radio terminal according to claim 18, wherein the integrated communication network has a CS Fallback function.

20. The mobile radio terminal according to claim 18, wherein the circuit switching network is a cdma2000 1x CS access network; and the control unit uses a radio frame on a sync channel to control the circuit switching network transmission/reception unit so as to maintain synchronization with a base station belonging to a cdma2000 1x CS access network serving as the circuit switching network.

21. A communication processing method comprising the steps of:
preparing a mobile radio terminal having a circuit switching network transmission/reception unit;
performing transmission and reception to and from a base station belonging to a circuit switching network, with use of a radio signal;
performing transmission and reception to and from a base station belonging to a mobile communication network, with use of the radio signal, the mobile communication network being connected to the circuit switching network and forming an integrated communication network together with the circuit switching network;
activating the circuit switching network transmission/reception unit and controlling the circuit switching network transmission/reception unit so as to maintain synchronization with the base station belonging to the circuit switching network, if the mobile radio terminal is on standby in the base station belonging to the mobile communication network; and
generating a synchronization processing clock serving as a reference of timing for acquiring synchronization with the circuit switching network,
wherein the control unit activates the circuit switching network transmission/reception unit on the basis of the synchronization processing clock generated by the synchronization processing clock generating unit.

* * * * *